US009633270B1

(12) United States Patent
Tangeland et al.

(10) Patent No.: US 9,633,270 B1
(45) Date of Patent: Apr. 25, 2017

(54) USING SPEAKER CLUSTERING TO SWITCH BETWEEN DIFFERENT CAMERA VIEWS IN A VIDEO CONFERENCE SYSTEM

(71) Applicant: Cisco Technology, Inc., San Jose, CA (US)

(72) Inventors: Kristian Tangeland, Oslo (NO); Erik Hellerud, Oslo (NO); Oystein Birkenes, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/091,056

(22) Filed: Apr. 5, 2016

(51) Int. Cl.
*H04N 7/15* (2006.01)
*G06K 9/00* (2006.01)
*H04N 5/232* (2006.01)
*G10L 17/00* (2013.01)
*G10L 17/10* (2013.01)

(52) U.S. Cl.
CPC ..... *G06K 9/00979* (2013.01); *G06K 9/00228* (2013.01); *G10L 17/005* (2013.01); *G10L 17/10* (2013.01); *H04N 5/23219* (2013.01); *H04N 5/23296* (2013.01); *H04N 7/15* (2013.01)

(58) Field of Classification Search
CPC H04N 7/15; H04N 7/152; H04N 7/14; H04N 7/142
USPC ............... 348/14.01–14.16, 207.99; 704/270
See application file for complete search history.

(56) References Cited

U.S. PATENT DOCUMENTS

| 5,959,667 | A | 9/1999 | Maeng |
| 6,005,610 | A | 12/1999 | Pingali |
| 6,593,956 | B1* | 7/2003 | Potts ............. G01S 3/7865 348/14.09 |
| 6,766,035 | B1 | 7/2004 | Gutta |
| 8,169,463 | B2 | 5/2012 | Enstad et al. |
| 8,248,448 | B2* | 8/2012 | Feng ............. G06K 9/00234 348/14.01 |
| 2004/0021765 | A1 | 2/2004 | Kubala et al. |
| 2013/0096922 | A1 | 4/2013 | Asaei et al. |
| 2013/0300939 | A1 | 11/2013 | Chou et al. |

(Continued)

OTHER PUBLICATIONS

Vajaria, et al., "Exploring Co-Occurence Between Speech and Body Movement for Audio-Guided Video Localization," IEEE Transactions on Circuits and Systems for Video Technology, vol. 18, No. 11, Nov. 2008, pp. 1608-1617.

(Continued)

*Primary Examiner* — Melur Ramakrishnaiah
(74) *Attorney, Agent, or Firm* — Edell, Shapiro & Finnan, LLC (57) ABSTRACT

A video conference endpoint includes one or more cameras to capture video of different views and a microphone array to sense audio. One or more closeup views are defined. The endpoint detects faces in the captured video and active audio sources from the sensed audio. The endpoint detects any active talker having detected face positions that coincide with detected active audio sources, and also uses speaker clustering to detect whether any active talker is associated with a previously stored closeup views. Based on whether an active talker is detected in any of the stored closeup views, the endpoint switches between capturing video of one of the closeup views and a best overview of the participants in the conference room.

20 Claims, 9 Drawing Sheets

(56) References Cited

U.S. PATENT DOCUMENTS

2013/0335508 A1  12/2013  Mauchly

OTHER PUBLICATIONS

Vajaria, et al., "Audio Segmentation and Speaker Localization in Meeting Videos," The 18th International Conference on Pattern Recognition (ICPR'06), Aug. 2006, 4 pages.

Trivedi, et al., "Intelligent Environments and Active Camera Networks," 2000 IEEE International Conference on Systems, Man, and Cybernetics, vol. 2, Oct. 2008, 6 pages.

Schmalenstroeer, et al., "Online Diarization of Streaming Audio-Visual Data for Smart Environments," IEEE Journal of Selected Topics in Signal Processing, vol. 4, No. 5, Oct. 2010, pp. 845-856.

Markov, et al., "Never-Ending Learning System for On-Line Speaker Diarization," IEEE Workshop on Automatic Speech Recognition & Understanding (ASRU 2007), Dec. 2007, pp. 699-704.

Liu, et al., "Online Speaker Adaptation and Tracking for Real-Time Speech Recognition," Interspeech 2005, Sep. 2005, 4 pages.

Koshinaka, et al., "Online Speaker Clustering Using Incremental Learning of an Ergodic Hidden Markov Model," IEEE International Conference on Acoustics, Speech and Signal Processing, 2009 (ICASSP 2009), Apr. 2009, pp. 4093-4096.

Khalidov, et al. "Audio-Visual Clustering for Multiple Speaker Localization," Author manuscript, published in "International Workshop on Machine Learning for Multimodal Interaction (2008)" Apr. 2009, 12 pages.

Kapralos, et al., "Audio-visual Localization of Multiple Speakers in a Video Teleconferencing Setting," Technical Report CS-2002-02, Jul. 15, 2002, 77 pages.

Hung, et al., "Towards Audio-Visual On-line Diarization of Participants in Group Meetings," Workshop on Multi-camera and Multi-modal Sensor Fusion Algorithms and Applications—M2SFA2 2008, Oct. 2008, 13 pages.

Hung, et al., "Associating Audio-Visual Activity Cues in a Dominance Estimation Framework," IEEE Computer Society Conference on Computer Vision and Pattern Recognition Workshops, 2008 (CVPRW '08), Jun. 2008, 6 pages.

Geiger, et al., "GMM-UBM based open-set online speaker diarization," Interspeech 2010, Sep. 2010, pp. 2230-2333.

Scola, et al., "Direction of arrival estimation—A two microphones approach," Master Thesis, Blekinge Institute of Technology, Sep. 2010, 86 pages.

Varma, "Time-Delay-Estimate Based Direction-of-Arrival Estimation for Speech in Reverberant Environments," Thesis submitted to the Faculty of The Bradley Department of Electrical and Computer Engineering, Virginia Polytechnic Institute and State University, Oct. 2002, 140 pages.

\* cited by examiner

CLOSEUP VIEW

FIG.3A

LOCAL VIEW

FIG.3B

BEST OVERVIEW

| SPEAKER CLUSTER | DETECTED TALKER POSITION | DETECTED FACIAL POSITION | CLOSEUP POSITION |
|---|---|---|---|
| CLUSTER 1 | P1 | P2 | CU1 |
| CLUSTER 2 | P3 | P4 | CU2 |
| CLUSTER 3 | P5 | P6 | X |
| CLUSTER 4 | P7 | P8 | CU4 |

FIG.9

USING SPEAKER CLUSTERING TO SWITCH BETWEEN DIFFERENT CAMERA VIEWS IN A VIDEO CONFERENCE SYSTEM

TECHNICAL FIELD

The present disclosure relates to using speaker clustering to automatically switch between camera views in a video conference system.

BACKGROUND

A video conference system includes an endpoint that captures audio and video of participants in a room during a conference, for example, and then transmits the audio and video to a conference server or to a "far-end" endpoint. The video conference system may frame closeup or zoomed-in camera views of talking participants (i.e., talkers). The video conference system may detect faces in the captured video to assist with framing the closeup camera views. Often, the video conference system frames a camera view of a talker that is significantly wider (i.e., more zoomed-out) than is desired because the video conference system is unable to detect a face of the talker. This occurs, for example, when the talker is not facing the camera. As a result, the video conference system frames zoomed-out camera views instead of more appropriate closeup views, and degrades the user experience.

DESCRIPTION OF EXAMPLE EMBODIMENTS

Overview

A method is disclosed wherein, at a video conference endpoint that includes a microphone and a camera, a position of a talker is determined based on audio detected by the microphone. Faces, and face positions, are also detected based on video captured by the camera. A test is then performed to determine whether the detected talker position matches any detected face position. If there is no match, speaker clustering operations are performed across a speech segment in the detected audio and speech segments in previously detected audio. Based on the results of the speaker clustering operations, a test is performed to determine whether the detected talker is known. If the detected talker is known, a test is then performed to determine whether the detected talker position matches a previous closeup position associated with the talker, wherein the previous closeup position is a previously detected talker position that matches a previously detected face. Based on the results of determining whether the detected talker position matches the previous closeup position of the talker, a camera view is framed that is either a closeup camera view on the previous closeup position or a non-closeup camera view based on the detected talker position.

EXAMPLE EMBODIMENTS

Figure 1:
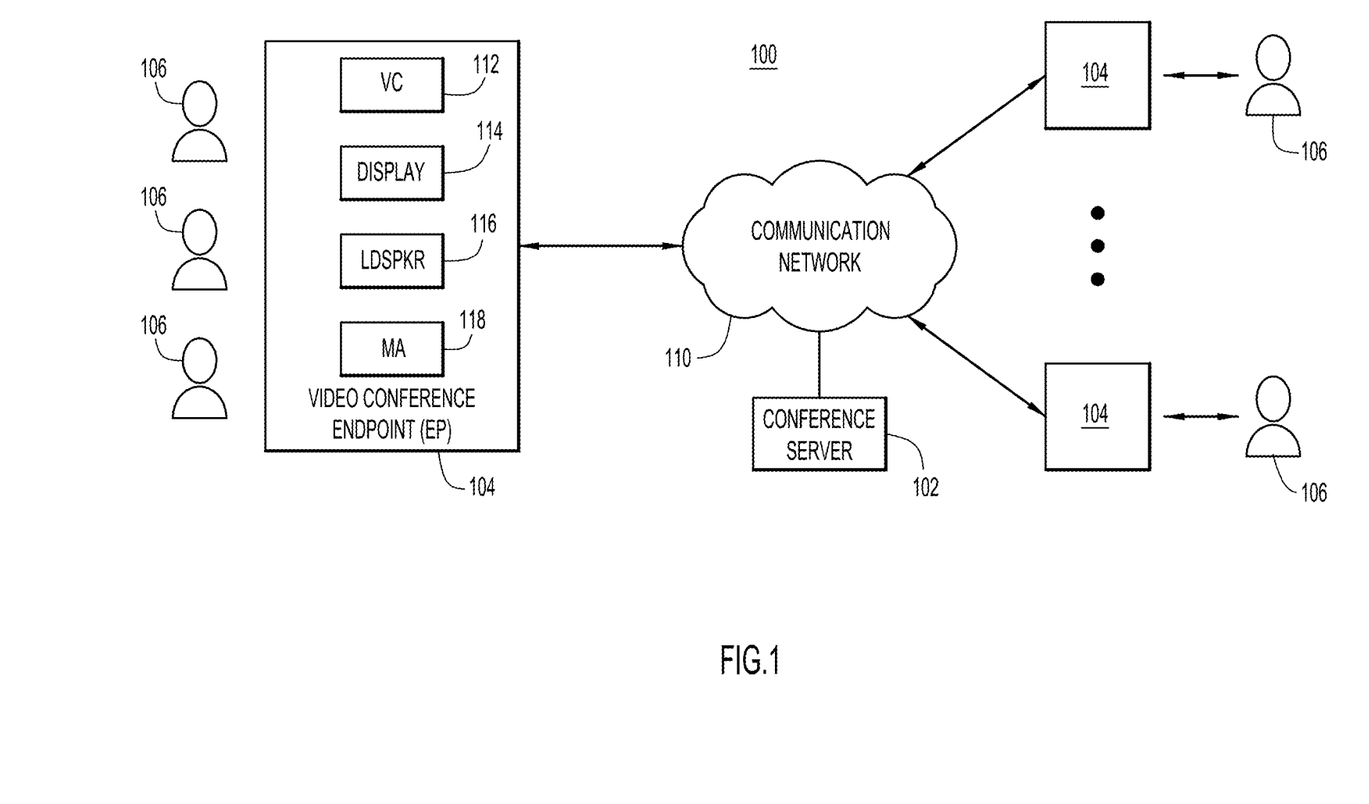
FIG. 1 is a block diagram of a video conference (e.g., teleconference) environment in which a video conference endpoint automates switching between different camera views during a video conference, according to an example embodiment.

With reference to FIG. 1, there is depicted a block diagram of a video conference (e.g., teleconference) environment 100 in which a video conference endpoint automates switching between different camera views to capture actively talking participants using speaker clustering. Video conference environment 100 includes video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include one or more video cameras (VC) 112, a video display 114, a loudspeaker (LDSPKR) 116, and a microphone array (MA) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with MA 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
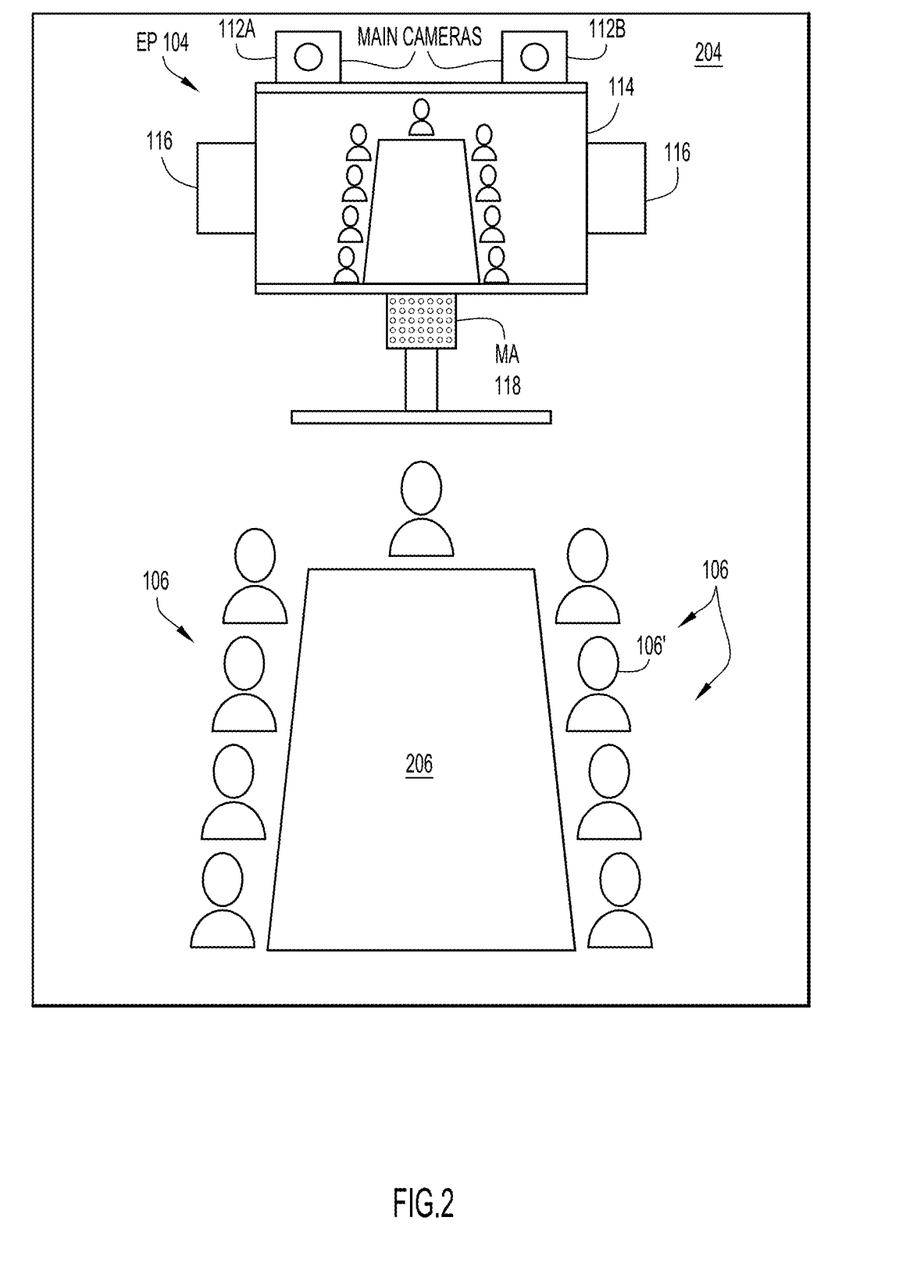
FIG. 2 is an illustration of video conference endpoint deployed in a conference room, according to an example embodiment.

Referring now to FIG. 2, there is an illustration of video conference endpoint 104 deployed in a conference room 204 (depicted simplistically as an outline in FIG. 2), according to an embodiment. Video conference endpoint 104 includes main or center video cameras 112A and 112B positioned proximate and centered on display 114. Each of cameras 112 typically includes pan, tilt, and zoom (PTZ) features that may be implemented mechanically and/or digitally. Endpoint 104 controls the pan, tilt, and zoom features of each of the cameras 112A and 112B (collectively referred to as "cameras 112") to capture video of different views/scenes of participants 106 seated around a table 206 opposite from or facing (i.e., in front of) the cameras (and display 114), including a participant 106' who is actively talking. The combination of two video cameras depicted in FIG. 2 is only one example of many possible camera combinations that may be used, as would be appreciated by one of ordinary skill in the relevant arts having read the present description. As depicted in the example of FIG. 2, MA 118 is positioned adjacent to, and centered along, a bottom side of display 114 (i.e., below the display) so as to receive audio from participants 106 and 106' in room 204.

In accordance with techniques presented herein, video conference endpoint 104 (i) detects participant faces and face positions based on video captured with cameras 112, (ii) detects positions of talking participants (i.e., "talkers") based on audio detected by MA 118, and (iii) performs speaker clustering of speech/voice frames present in the detected audio to identify the talkers based on their speech patterns. Based on the detected faces and face positions, the detected talker positions, and results of the speaker clustering, video conference endpoint 104 automatically controls cameras 112 to capture video of different camera views of participants 106; more specifically, the endpoint controls cameras 112 to switch between different camera views (referred to more simply as "views") in which video is captured.

In an embodiment, the different views include a closeup view, a local view, and a best overview. The closeup view focuses on one active talker among the participants, the local view focuses on a localized cluster of active talkers among the participants, and the best overview is a dynamic overview or wide-angle view to capture video of all detected participant faces, for example. Endpoint 104 creates dynamic views, without user input to define the different views initially, and controls cameras 112 to dynamically adjust the dynamic views when created/operable as participants 106 and 106' shift positions within, leave, and/or enter the dynamic view (e.g., the endpoint adjusts camera zoom, pan, and/or tilt associated with the dynamic view). When operable, a given view, e.g., closeup, local or best, is based on the endpoint successfully correlating the position of an input audio stream with the position of a captured face and/or identifying a talker based on previously clustered audio input segments.

Figure 3A:
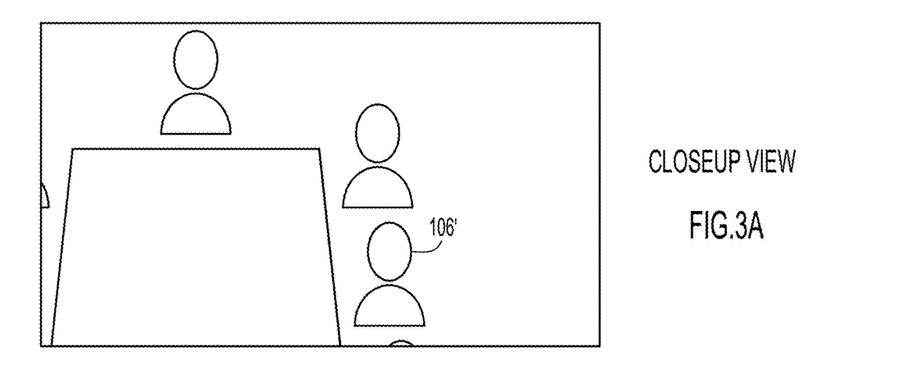
FIG. 3A is an illustration of a closeup camera view, according to an example embodiment.
Figure 3B:
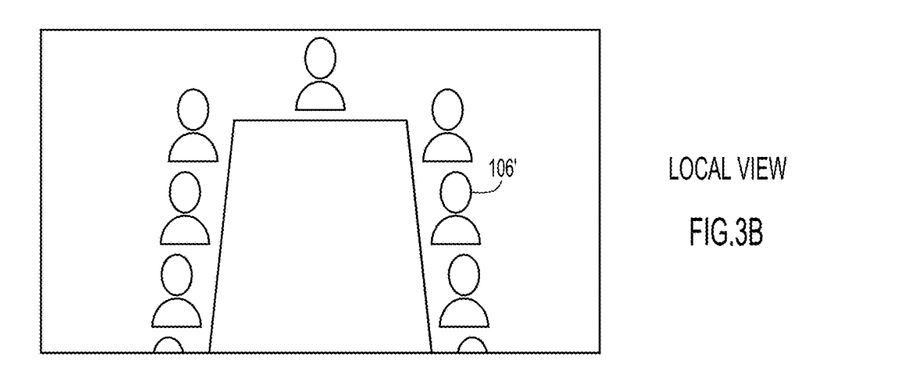
FIG. 3B is an illustration of a local camera view, according to an example embodiment.
Figure 3C:
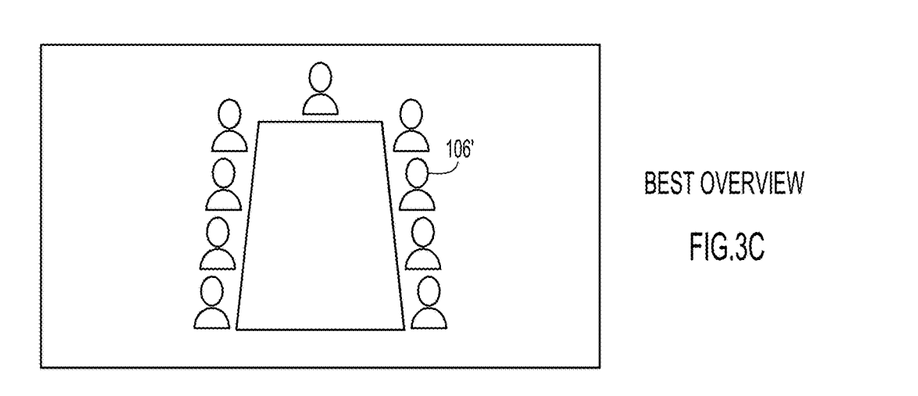
FIG. 3C is an illustration of a best fit camera overview, according to an example embodiment.

Examples of the above-mentioned different views are depicted in FIGS. 3A-3C. FIG. 3a is an illustration of a closeup view focused on participant 106' as an active talker. The closeup view has an outer boundary fitted relatively tightly to the active talker but allows room to show, e.g., the face and an upper body of the active talker with extra margin to accommodate participant movement. Controller 408 may control one of cameras 112 to adjust a center position and the outer boundary dynamically to account for such movement. To achieve the closeup view, controller 408 may control one of cameras 112 with a closeup camera zoom factor that is based on a distance from the camera to the active talker. FIG. 3B is an illustration of a local view focused on a subset of participants 106 including participant 106'. By way of example, controller 408 may determine an appropriate zoom factor for the local view by multiplying the closeup zoom factor by a fraction, e.g., 0.8. FIG. 3C is an illustration of a best-fit overview encompassing all of participants 106 and 106'. The best-fit overview is a view centered on the group of participants 106 and 106' and in which the degree of camera zoom establishes an outer boundary around the group. The outer boundary is fitted relatively tightly to the group but allows room to show, e.g., the face and an upper body of each of the participants with extra margin to accommodate participant movement. Controller 408 may adjust the outer boundary dynamically to account for such movement, and when new faces are detected or when previously detected faces become undetectable.

Figure 4:
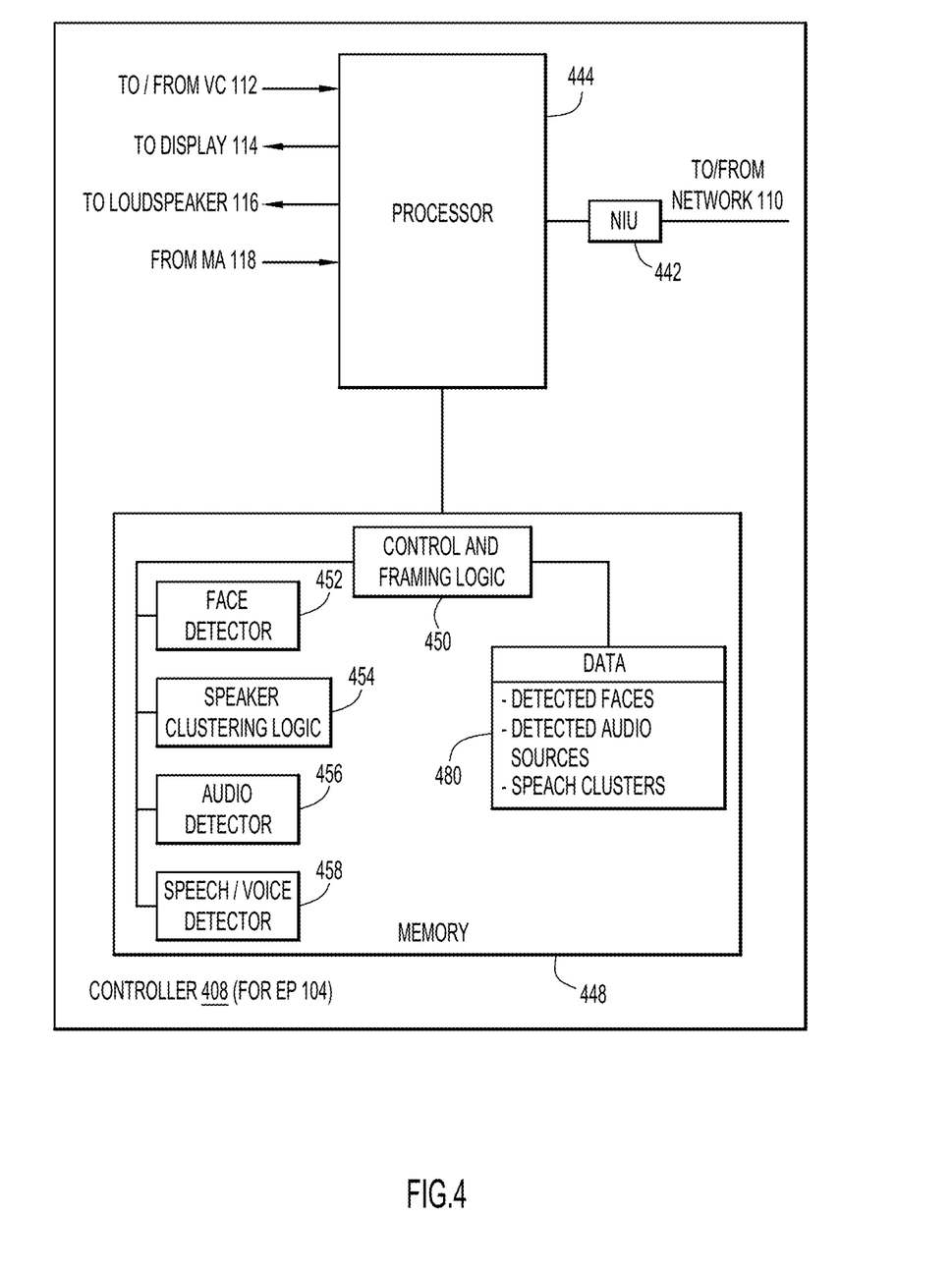
FIG. 4 is block diagram of a controller of the video conference endpoint, according to an example embodiment.

Reference is now made to FIG. 4, which shows an example block diagram of a controller 408 of video conference endpoint 104 configured to perform automated switching between different camera views according to embodiments described herein. There are numerous possible configurations for controller 408 and FIG. 4 is meant to be an example. Controller 408 includes a network interface unit 442, a processor 444, and memory 448. The network interface (I/F) unit (NIU) 442 is, for example, an Ethernet card or other interface device that allows the controller 408 to communicate over communication network 110. Network I/F unit 442 may include wired and/or wireless connection capability.

Processor 444 may include a collection of microcontrollers and/or microprocessors, for example, each configured to execute respective software instructions stored in the memory 448. The collection of microcontrollers may include, for example: a video controller to receive, send, and process video signals related to display 114 and video cameras 112; an audio processor to receive, send, and process audio signals related to loudspeaker 116 and MA 118; and a high-level controller to provide overall control. Processor 444 may send pan, tilt, and zoom commands to video cameras 112, which is responsive to the commands as would be appreciated by one of ordinary skill in the relevant arts. Portions of memory 448 (and the instruction therein) may be integrated with processor 444. In the transmit direction, processor 444 encodes audio/video captured by MA 118/VC 112, encodes the captured audio/video into data packets, and causes the encoded data packets to be transmitted to communication network 110. In a receive direction, processor 444 decodes audio/video from data packets received from communication network 110 and causes the audio/video to be presented to local participants 106 via loudspeaker 116/display 114. As used herein, the terms "audio" and "sound" are synonymous and interchangeably.

The memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 448 may comprise one or more computer readable storage media (e.g., a memory device) encoded with software comprising computer executable instructions and when the software is executed (by the processor 444) it is operable to perform the operations described herein. For example, the memory 448 stores or is encoded with instructions for Control and Framing logic 450 to perform overall control of endpoint 104 and operations described herein for switching between different views. Control and Framing logic 450 includes a Face Detector 452 to detect faces and face positions based on captured video, Speaker Clustering Logic 454 to continuously assign speech segments in detected audio into distinct speaker clusters based on speech characteristics, an Audio Detector 456 to detect positions of active audio sources (e.g., talkers) based on the detected audio, and a Speech/Voice Detector 458 to identify portions of detected audio that include speech frames/segments and portions of the detected audio that do not, and provide those indications to the Speaker Clustering Logic 454.

In addition, memory 448 stores data 480 used and generated by logic/detectors 450-458, including, but not limited to: information associated with detected faces (e.g., positions, confidence levels, stored detected faces, and the like); information associated with detected active audio sources (e.g., positions of speakers); and information defining speaker clusters from received audio sources.

Figure 5:
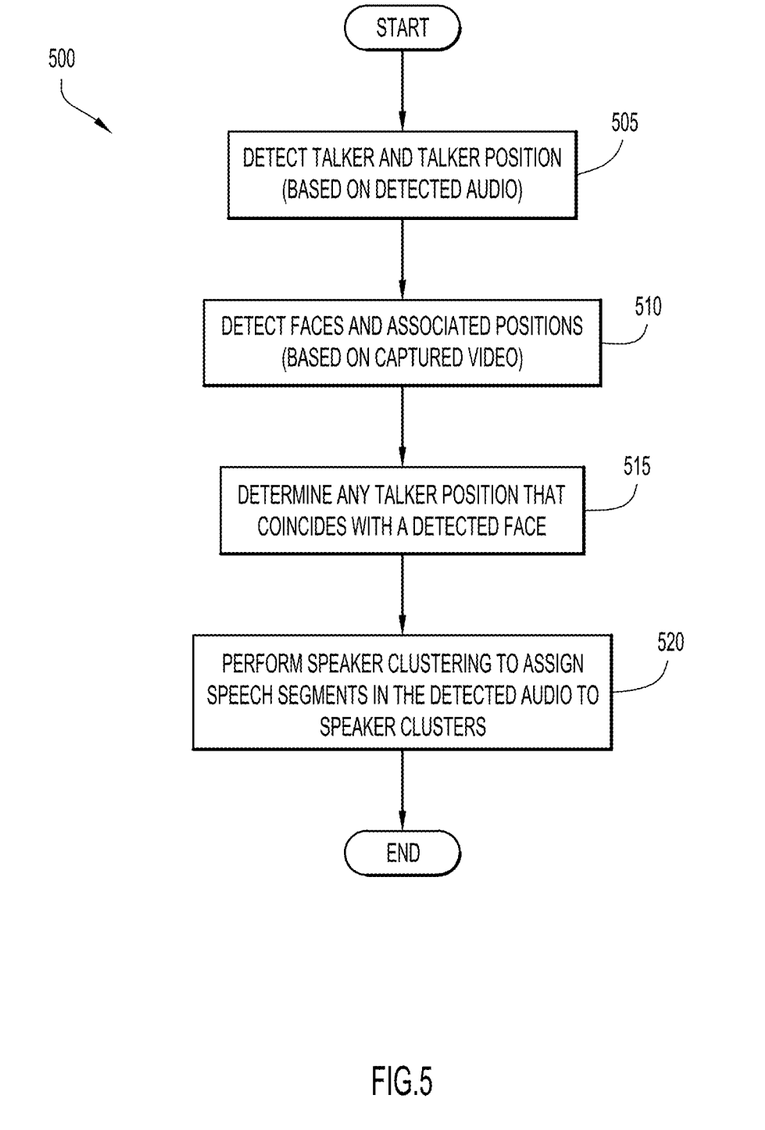
FIG. 5 is a flowchart of an example method of operations performed to detect talker positions, detect faces, and determine talker identity through speaker clustering, and store various results from those operations, according to an example embodiment.

With reference to FIG. 5, there is a flowchart of example operations 500 performed by controller 408 to detect talker positions, detect faces, and determine talker identity through speaker clustering, and store various results from those operations. Example results are described below in connection with FIG. 9. The results represent associations between the detected faces, detected talker positions and talker identities, and can be used to switch between different views. Logic for switching between the different views based on such results will be described below in connection with FIG. 10.

At 505, controller 408 detects positions of talkers (i.e., detected talker positions) based on detected audio, and stores the detected talker positions. Controller 408 may use any now known or hereafter developed technique to detect the talker positions.

At 510, controller 408 detects faces and face positions in captured video, and stores information associated with the detected faces. Controller 408 may use any now known or hereafter developed technique to detect the faces. Typically, such techniques detect facial features, such as eyes, nose, mouth, hair, etc.

At 515, controller 408 determines which captured face positions coincide with which detected talker positions, if any. Controller 408 flags each detected talker position that coincides with a detected face position as a "closeup position."

At 520, controller 408 performs speaker clustering on a speech segment included in the detected audio to assign the detected speech segment to a distinct speaker cluster. Any known or hereafter developed speaker clustering technique may be used, such as maximum likelihood estimation, ergodic Markov modeling, Viterbi scoring, speaker diarization, and so on. Speaker clustering may operate in the following manner. If the speaker clustering determines that the speech segment includes speech characteristics that match speech characteristics of previous speech segments already assigned to an existing speaker cluster, the speaker clustering assigns the speech segment to the existing speaker cluster. If the speaker clustering determines that the speech segment does not match the existing speaker cluster, the speaker clustering assigns the speech segment to a new speaker cluster, i.e., starts a new speaker cluster. Assuming multiple talkers, over time, speaker clustering establishes multiple speaker clusters, where each speaker cluster is uniquely associated with, or uniquely identifies, a corresponding one of the talkers. A talker associated with a given speaker cluster is thus referred to as a "known" talker.

Assuming operation 515 detected a talker position based on the detected audio and operation 520 assigned the speech segment from that same detected audio (or a portion thereof) to a speaker cluster, then the detected talker position and the speaker cluster are time correlated, such that the detected talker position can be assumed to be the position of the known talker uniquely identified by or associated with the speaker cluster. Thus, controller 408 associates or maps each speaker cluster, representative of a known talker, to the associated talker position and the associated face position that coincides with the detected talker position (if available).

Figure 6:
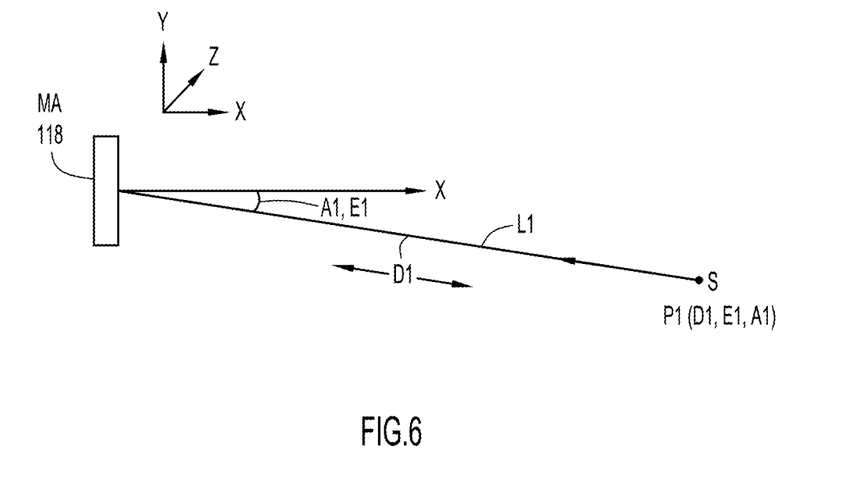
FIG. 6 is an illustration of an active audio source spaced apart from a microphone array of the video conference endpoint, according to an example embodiment.

Operation 505 (i.e., detecting a talker position based on audio) is further described with reference to FIG. 6, which depicts a side-view of an example active audio source S spaced apart from MA 118. The audio source may represent an active talker among participants 106 and 106'. Audio source S is separated or spaced from MA 118 by a distance D1 along a directional axis line L1. Audio source S subtends an elevation angle E1 relative to an x-z plane (i.e., the plane encompassing both the x axis and the z axis) and an azimuth angle A1 relative to an x-y plane (i.e., the plane encompassing both the x axis and the y axis). Distance D1, elevation angle E1, and azimuth angle A1 collectively define a 3-Dimensional (3-D) position P1 of audio source S relative to MA 118. MA 118 receives audio/sound from audio source S, senses/transduces the audio, and provides the sensed audio to controller 408. Controller 408 performs audio signal processing on the sensed audio, particularly from different spaced-apart pairs of microphones of MA 118, to derive a sound angle of arrival at MA 118 of the audio originating from audio source S. In an embodiment in which MA 118 is a planar 2-D MA, the derived sound angle of arrival encompasses elevation angle E1 and azimuth angle A1, and range D1, which collectively represent a talker position P1.

In one example, the sound angle of arrival may be derived based on a time difference $\Delta t$ between time-of-arrivals (TOAs) of sound received at (and sensed/transduced by) the individual microphones. The sound angle of arrival may be determined based on the following formula: sound angle of arrival=$\arcsin(\Delta t * c/d)$, where: $\Delta t$=the TOA time difference; d=the individual microphone spacing; and c=the speed of sound in air at a given air temperature T. Additionally, controller 408 also derives distance D1 between MA 118 and audio source S based on a combination of multiple time differences $\Delta t$ derived from the sensed audio from the different microphone pairs. Thus, controller 408 derives an estimate of the 3-D position P1 of audio source S (e.g., an active talker) as estimates of the parameters: distance D1; elevation angle E1, and azimuth angle A1. In another example, the angle and range of incoming audio can be calculated by finding the sample delay between microphone pairs. The sample delay for one pair corresponds to a limited number of positions in space. By combining the results from multiple pairs the result will be refined down to a single possible position.

Figure 7:
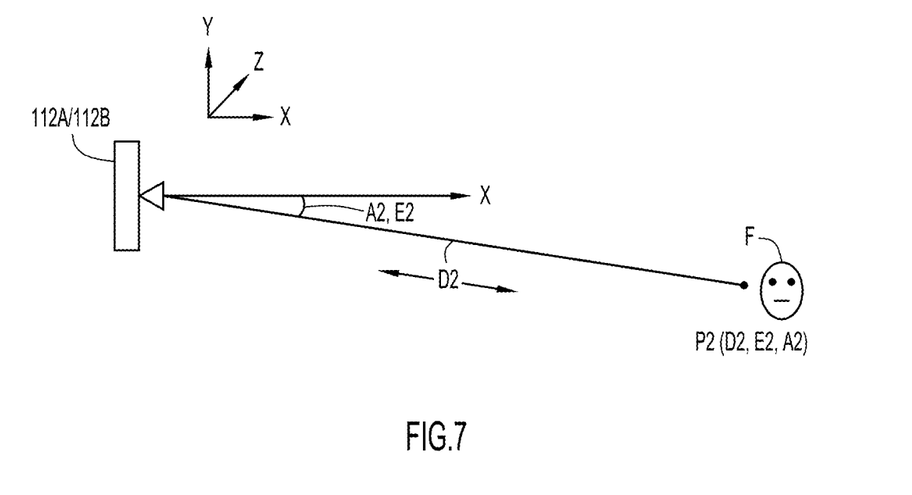
FIG. 7 is an illustration of a face of a participant spaced apart from video cameras of the video conference endpoint, according to an example embodiment.

Operation 510 (i.e., detecting a face and a face position) is further described with reference to FIG. 7, which depicts a side-view of an example face F of a participant spaced apart from video cameras 112, which may or may not coincide with position P1 of audio source S. Participant face F is separated or spaced from video cameras 112 by a distance D2. Participant face F subtends an elevation angle E2 relative to an x-z plane and an azimuth angle A2 relative to an x-y plane. Distance D2, elevation angle E2, and azimuth angle A2 collectively define a 3-Dimensional (3-D) position P2 of participant face F relative to video cameras 112. Controller 408 receives video captured by one or both of cameras 112. Controller 408 performs image processing on the captured video to detect face F and its associated 3-D position P2 as estimates of parameters: distance D2; elevation E2; and azimuth angle A2.

Figure 8:
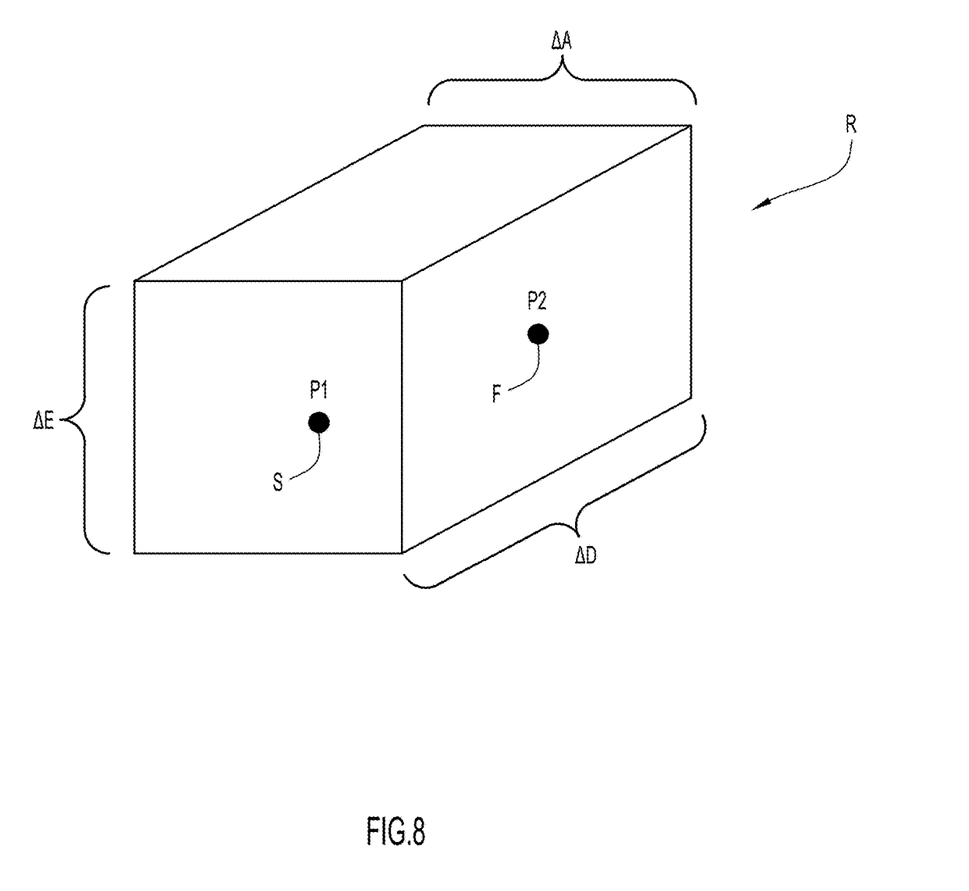
FIG. 8 is an illustration of an example construct used to determine whether the audio source from FIG. 6 and the face position from FIG. 7 coincide with each other, according to an example embodiment.

Operation 515 (i.e., determining if a detected talker position and a detected face position coincide, i.e., match) is further described with reference to FIG. 8, which is an illustration of an example construct used to determine whether audio source S (FIG. 6) and face position F (FIG. 7) coincide with each other, i.e., whether their respective positions match each other within a predetermined tolerance. Audio source S at position P1 and face F at position P2 are determined to coincide with each other if it is determined that position P2 is within a predetermined 3-D positional range R centered on position P1. In the example of FIG. 8, positional range R is depicted as a box centered on P1 and defining an elevation angle range ΔE, an azimuth angle range ΔA, and a distance range ΔD. In an example, the maximum angular distance between a detected face and a detected talker position is between 2 and 3.5 times the width of the face detection, depending on the estimated speaker distance. The distance estimate of the talker position preferably differs by less than 50% from the estimated face distance. If these requirements are met the face detection and the audio position are positively matched.

Controller 408 is configured to translate position parameters, e.g., camera field of view (FOV), D1, E1, A1, D2, E2 and A2, of a 3-D position to corresponding camera control settings (e.g., zoom, tilt, and pan settings) to establish a camera view that coincides with the 3-D position. This enables controller 408 to detect active talkers and/or participant faces, e.g., at positions P1 and/or P2, and then direct cameras 112 to capture video from those positions. In other words, controller 408 may control one or more of cameras 112 to capture video in a view of the detected active talker and/or face.

Figure 9:
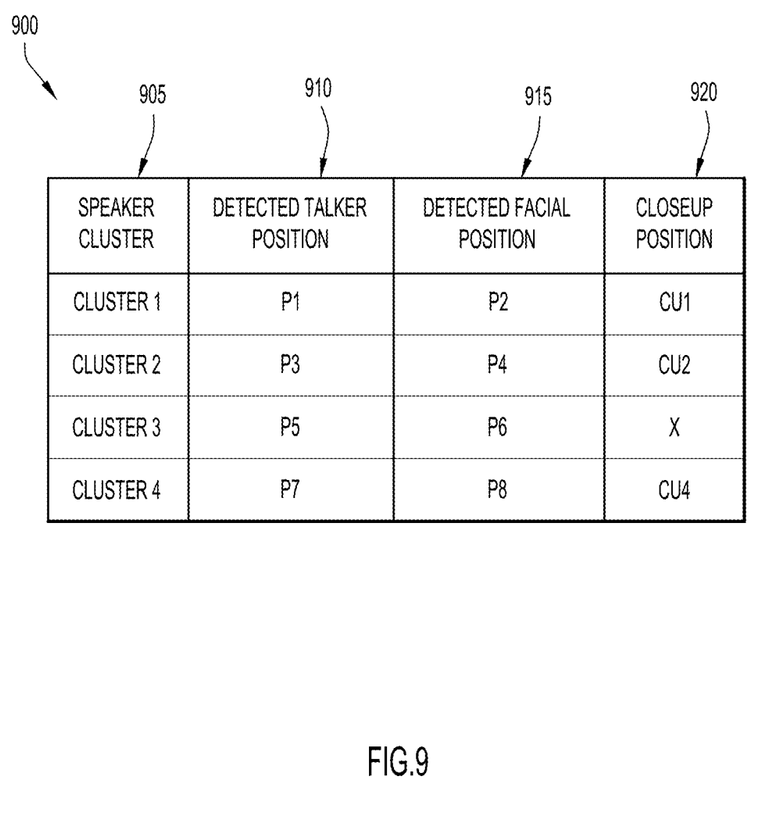
FIG. 9 is a an illustration of a database that stores speaker clusters, detected talker positions, and detected face positions generated by the method of FIG. 5, according to an example embodiment.

With reference to FIG. 9, there is an illustration of example information 900 (also referred to as "speaker cluster data" 900) generated by/in operations 500 and stored in memory 448. Speaker cluster data 900 is shown in tabular form in FIG. 9 by way of example only. Speaker cluster data 900 includes columns identifying speaker clusters 905, detected talker positions 910, detected face positions 915, and closeup position flags 920. Speaker cluster data 900 includes rows, where each row corresponds to a distinct speaker cluster (and thus known talker) and its associated detected talker position, detected face position, and closeup flag, if any. The example of FIG. 9 represents a situation in which the speaker clustering of operation 520 has identified 4 distinct talkers represented at cluster 1, cluster 2, cluster 3, and cluster 4 in speaker cluster data 900. In the example, the row for cluster 1 includes an associated detected position P1, an associated detected face position P2, and a closeup flag CU1 to indicate that the positions P1 and P2 coincide, i.e., "match." Similar information is stored in the rows for clusters 2-4, except that there is no closeup flag for cluster 3, which indicates that P5 and P6 do not match.

Figure 10:
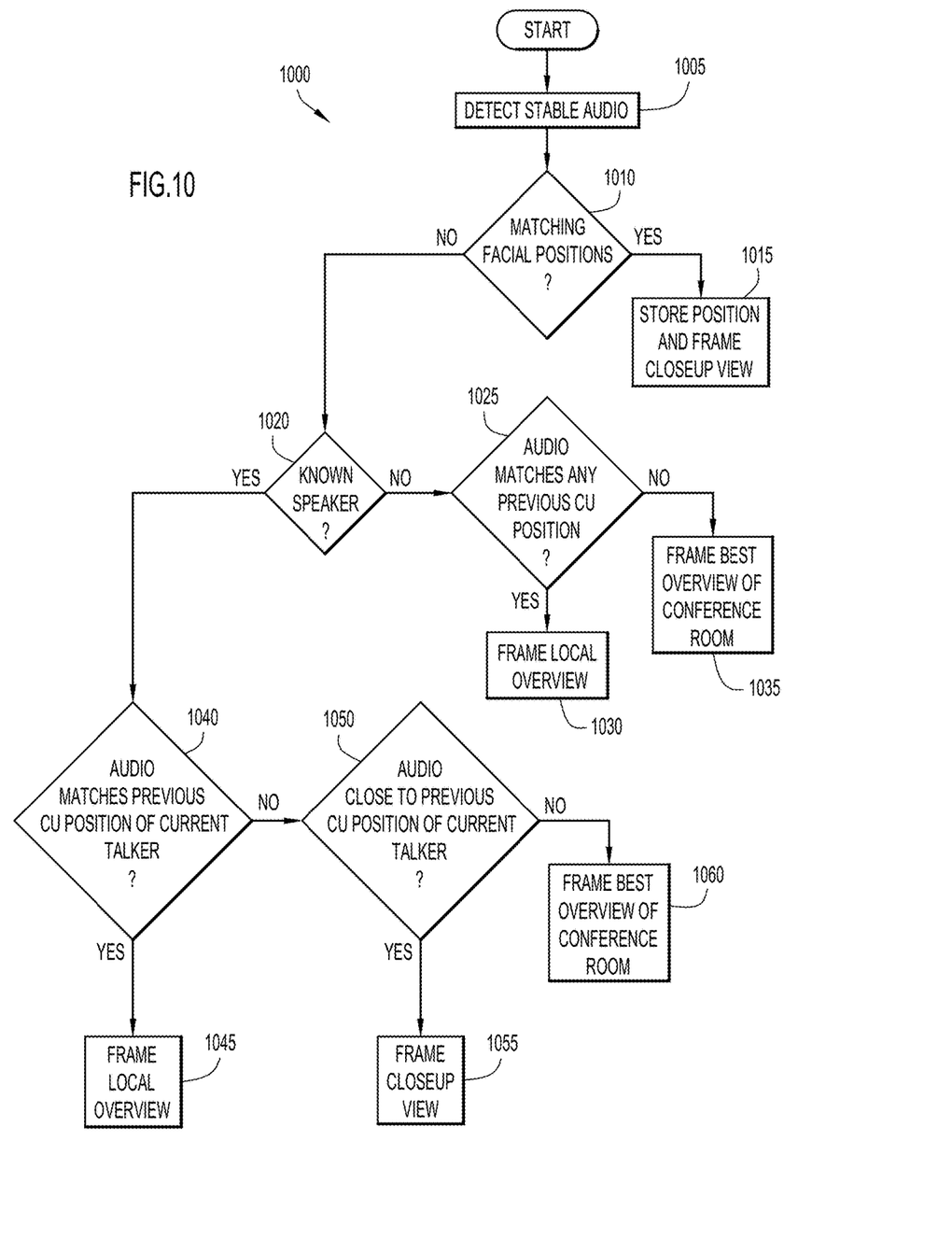
FIG. 10 is a flowchart of an example method of performing automated switching between closeup and non-closeup camera views during a video conference based on speaker clustering, according to an example embodiment

With reference to FIG. 10, there is depicted a flowchart of an example method 1000 of automated switching between closeup, local and best overview views during a video conference based on results of speaker clustering, as well as face and voice detection. Method 1000 is performed primarily by controller 408. The operations of method 1000 include operations of method 500 that generate results (shown for example in FIG. 9) used by camera view switching logic of method 1000.

It is assumed that either of cameras 112 is active meaning that the camera captures video of a view/scene, endpoint 104 processes (e.g., encodes) the video captured by that camera, and transmits the processed video to communication network 110. It is also assumed that MA 118 detects audio.

At 1005, controller 408 detects a stable audio source and an associated position thereof based on the detected audio. By way of example, controller 408 may determine that a detected audio source is stable if controller 408 determines that the detected audio is continuously originating from the same (detected) position for more than 1 second. If controller 408 determines that the audio source is stable, then that audio source is assumed to represent a talker and the detected position of the stable audio source is assumed to represent a position of the talker, i.e., at the detected talker position. In the ensuing description, the "detected talker position" is referred to simply as the "talker position." Operation 1005 corresponds to operation 505 in FIG. 5.

At 1010, controller 408 detects a face and a face position in the captured video and determines whether the detected face position coincides (i.e., matches) with the talker position. If controller 408 determines that the detected face and talker positions do not match flow proceeds to 1020. Otherwise, flow proceeds to 1015. Operation 1010 corresponds to operations 510 and 515 in FIG. 5.

At 1015 (the detected face and talker positions match at 1010), controller 408 stores the talker position, for example, in speaker cluster data 900, and frames a closeup camera view that focuses on the talker based at least on the talker position. Flow returns to 1005.

At 1020 (the detected face and talker positions do not match at 1010), controller 408 determines whether the talker (whose position was detected at 1005) is known using speaker clustering. To do this, the speaker clustering attempts to match one or more speech segments in the detected audio (from 1005) with one or more speech segments stored in an existing speaker cluster based on speech characteristics of the speech segment. If the speaker clustering succeeds in matching the one or more speech segments with an existing speaker cluster, controller 408 determines that the talker is known, and flow proceeds to 1040. Conversely, if the speaker clustering fails to find a match, controller 408 determines that the talker is not known, i.e., is a new talker, and flow proceeds to 1025. Operation 1020 corresponds at least in part to operation 520 in FIG. 5.

At 1025 (the talker is not known), controller 408 determines whether the talker position matches, within a first predetermined positional tolerance, a closeup position associated with any existing speaker cluster, i.e., a previous (known) talker. If controller 408 determines that the detected talker position matches the closeup position associated with any previous (known) talker, flow proceeds to 1030, otherwise flow proceeds to 1035.

At 1030, controller 408 uses the positional information associated with the previous (known) talker whose closeup position matches the talker position to frame a local camera view that focuses on the talker. Flow returns to 1005.

At 1035, controller 408 controls cameras 112 to frame a best-fit overview that encompasses all of the detected faces. Flow returns to 1005.

At 1040, controller 408 determines whether the talker position matches, within the first predetermined positional tolerance, the closeup position associated with the previous (known) talker whom controller 408 identifies as being the talker. If controller 408 determines that the position of the talker matches the closeup position associated with the previous (known) talker identified as the active talker, flow proceeds to 1045, otherwise flow proceeds to 1050.

At 1045, controller 408 controls cameras 112 to frame a closeup camera view that focuses on the talker based on the detected talker position (from 1005). Flow returns to 1005.

At 1050, controller 408 determines whether the detected talker position is within a second predetermined positional tolerance of the closeup position associated with the previous (known) talker whom controller 408 identified as being the talker, i.e., whether the detected talker is near the closeup position previously associated with the talker. By way of example, the second predetermined tolerance may be larger than the first predetermined tolerance, allowing controller 408 to determine whether the talker has moved, from an earlier position, a distance that is greater than the first predetermined tolerance but is less than or equal to the second predetermined tolerance. If controller 408 determines that the detected talker position is within the second predetermined positional tolerance of the closeup position previously associated with the talker, flow proceeds to 1055, otherwise flow proceeds to 1060.

At 1055, controller 408 controls cameras 112 to frame a local camera view that focuses on the talker using the positional information associated with the previous (known) talker whose closeup position matches the talker position. Flow returns to 1005.

At 1060, controller 408 selects the view that is best suited to the conference setting, i.e., frames a best-fit overview, that encompasses all of the detected faces and then controls cameras 112 to capture video of that overview.

Flow control returns to 1005 and method 1000 repeats. As method 1000 repeats over time, controller 408 implements speaker clustering to assign active talkers to speaker clusters and dynamically adjusts the framed camera view based on the speaker clustering and the detected face and audio source (active talker) positions.

In summary, embodiments of the system described herein add another input to the decision-making process in speaker tracking, based on continuously clustering speech into different speakers clusters. For example, for each closeup view, the system assigns a detected speaker cluster to an associated closeup position. If a talker is detected, but a matching face is not detected, the system has two possible alternatives. For example, if the detected talker matches a previous closeup position, the system frames a local camera view, i.e., a more zoomed-out closeup. This will typically occur when a talker is talking away from the system or into the room. Alternatively, if the detected audio source does not match a previous closeup position, the system frames a best room overview. This typically occurs when a talker has moved slightly away from a previously stored talker position (e.g., leaned back/forth).

Advantages of the embodiments include providing a better understanding of real-time conference room scenarios and, as a result, an increased ability to show more zoomed-in views. For example, if the current speaker cluster matches a previous speaker cluster assigned to a specific closeup position, the system can frame a closeup instead of a local overview, without needing to confirm a matching face detection because the system may have enough confidence that the current talker is the same talker in the same position. Furthermore, if the current speaker cluster matches a previous speaker cluster assigned to a closeup position that is close to a position of the current talker, the system may show a local overview instead of a room overview because it has enough confidence that the current talker is the same person represented by the previous speaker cluster (but has moved slightly).

In another embodiment, if two people, e.g., person A and person B, sitting on opposite sides of a table are having a back-and-forth discussion, the system employs an aggressive timer to match the discussion occurring between these two talkers, allowing a closeup or local camera view to include both person A and person B in the same framing. The system accomplishes this result by storing a previous closeup position, along with its speaker cluster, to continuously assign speaker clusters to closeup positions. Therefore, whenever a new talker is introduced, if the corresponding speaker cluster is the same as that of a previously stored speaker cluster, the system switches to a closeup earlier than a predefined switching time or frames a camera view that includes both talkers.

By way of example only, an embodiment described herein may use speaker diarization to implement speaker clustering operations. The speaker diarization operations may be implemented in the camera, the endpoint device and/or in the cloud.

An advantage of including speaker clustering into speaker tracking is that it introduces a new input source for decision-making. By including a reliable third input into the decision-making process, the system herein has a better understanding of real-time tracking occurring in a video conference room, vis-à-vis prior art systems. The system therefore has the flexibility to rely on speaker clustering operations in combination with either of the two current inputs, i.e., audio and facial detection, to switch between different camera frames, significantly improving the end user experience by showing more relevant crop views (e.g., by replacing best overviews with more local overviews and closeups) and making the displayed views appear more similar to a professional TV production.

In summary, in one form, a method is provided comprising: detecting a talker position of a talker based on audio detected by the microphone; detecting faces and face positions in video captured by the camera; determining whether the detected talker position matches any detected face position; if there is no match, performing speaker clustering across a speech segment in the detected audio and speech segments in previously detected audio; if the speaker clustering indicates the talker is known, determining whether the detected talker position matches a previous closeup position of the talker, wherein the previous closeup position is a previously detected talker position that matches a previously detected face; and based on results of the determining whether the detected talker position matches the previous closeup position of the talker, framing either a closeup camera view on the previous closeup position or a non-closeup camera view based on the detected talker position.

In summary, in another form, an apparatus is provided comprising: one or more cameras controllable to capture video of different views; a microphone array to sense audio; and a processor, coupled to the one or more cameras and the microphone array, to: detect a talker position of a talker based on audio detected by the microphone; detect faces and face positions in video captured by the camera; determine whether the detected talker position matches any detected face position; if there is no match, perform speaker clustering across a speech segment in the detected audio and speech segments in previously detected audio; if the speaker clustering indicates the talker is known, determine whether the detected talker position matches a previous closeup position of the talker, wherein the previous closeup position is a previously detected talker position that matches a previously detected face; and based on results of the determining whether the detected talker position matches the previous closeup position of the talker, frame either a closeup camera view on the previous closeup position or a non-closeup camera view based on the detected talker position.

In summary, in yet another form, a processor readable medium is provided to store instructions that, when executed by a processor, cause the processor to: detect a talker position of a talker based on audio detected by one or more microphones; detect faces and face positions in video captured by one or more cameras; determine whether the detected talker position matches any detected face position; if there is no match, perform speaker clustering across a speech segment in the detected audio and speech segments in previously detected audio; if the speaker clustering indicates the talker is known, determine whether the detected talker position matches a previous closeup position of the talker, wherein the previous closeup position is a previously detected talker position that matches a previously detected face; and based on results of the determining whether the detected talker position matches the previous closeup position of the talker, frame either a closeup camera view on the previous closeup position or a non-closeup camera view based on the detected talker position.

The above description is intended by way of example only. Various modifications and structural changes may be made therein without departing from the scope of the concepts described herein and within the scope and range of equivalents of the claims.

What is claimed is:

1. A method comprising:
at a video conference endpoint including a microphone and a camera:
detecting a talker position of a talker based on audio detected by the microphone;
detecting one or more faces and face positions in video captured by the camera;
determining whether a detected talker position matches any detected face position;
if there is no match, performing speaker clustering across a speech segment in the detected audio and speech segments in previously detected audio;
if the speaker clustering indicates the talker is known, determining whether the detected talker position matches a previous closeup position of the talker, wherein the previous closeup position is a previously detected talker position that matches a previously detected face; and
based on results of the determining whether the detected talker position matches the previous closeup position of the talker, framing either a closeup camera view on the previous closeup position or a non-closeup camera view based on the detected talker position.

2. The method of claim 1, wherein the framing includes:
if it is determined that the detected talker position matches the previous closeup position of the talker within a first predetermined positional tolerance, framing the closeup camera view; and
if it is determined that the detected talker position does not match the previous closeup position of the talker within the first predetermined positional tolerance, framing the non-closeup camera view.

3. The method of claim 2, wherein the framing further includes:
if it is determined that the detected talker position does not match the previous closeup position of the talker within the first predetermined positional tolerance:
determining whether the detected talker position matches the previous closeup position of the talker within a second predetermined positional tolerance that is greater than the first predetermined positional tolerance;
if it is determined that the detected talker position matches the previous closeup position of the talker within the second predetermined positional tolerance, framing the non-closeup camera view as a local camera view that is zoomed-out from the closeup camera view; and
if it is determined that the detected talker position does not match the previous closeup position of the talker within the second predetermined positional tolerance, framing the non-closeup camera view as a best camera overview that is zoomed-out from the local camera view.

4. The method of claim 2, wherein:
the framing the closeup camera view includes using a closeup camera zoom factor for the closeup camera view that is based on a distance of the talker position from the microphone; and
the framing the local camera view includes using a local camera zoom factor for the local camera view that is a fraction of the closeup camera zoom factor.

5. The method of claim 1, if the speaker cluster indicates that the talker is not known:
determining whether the detected talker position matches a previous closeup position of any previously known talker; and
if it is determined that the detected talker position matches a previous closeup position of a previously known talker, framing a local camera view on the previous closeup view.

6. The method of claim 5, if it is determined that the detected talker position does not match a previous closeup position of any previously known talker, framing a best overview that is zoomed-out from the closeup camera view.

7. The method of claim 1, if it is determined that the detected talker position matches a detected face position, framing a closeup camera view on the detected talker position.

8. The method of claim 1, wherein:
the speaker clustering includes attempting to match the speech segment in the detected audio to speech segments in the previously detected audio based on speech characteristics; and
if the attempting to match succeeds, determining that the detected talker is known, otherwise determining that the detected talker is not known.

9. The method of claim 8, further including:
if the speech segment matches one or more speech segments in a previous speaker cluster, assigning processed speech segments in the detected audio to the previous speaker cluster; and
if the processed speech segments in the detected audio do not match speech segments in a previous speaker cluster, assigning processed speech segments in the detected audio to a new speaker cluster.

10. The method of claim 1, further comprising detecting the previously detected talker position from previously detected audio and detecting the previously detected face from previously captured video.

11. An apparatus comprising:
one or more cameras controllable to capture video of different views;
a microphone array to sense audio; and
a processor, coupled to the one or more cameras and the microphone array, to:
detect a talker position of a talker based on audio detected by the microphone;
detect one or more faces and face positions in video captured by the camera;
determine whether a detected talker position matches any detected face position;

if there is no match, perform speaker clustering across a speech segment in the detected audio and speech segments in previously detected audio;
if the speaker clustering indicates the talker is known, determine whether the detected talker position matches a previous closeup position of the talker, wherein the previous closeup position is a previously detected talker position that matches a previously detected face; and
based on results of determining whether the detected talker position matches the previous closeup position of the talker, frame either a closeup camera view on the previous closeup position or a non-closeup camera view based on the detected talker position.

12. The apparatus of claim 11, wherein the processor is configured to frame by:
if it is determined that the detected talker position matches the previous closeup position of the talker within a first predetermined positional tolerance, frame the closeup camera view; and
if it is determined that the detected talker position does not match the previous closeup position of the talker within the first predetermined positional tolerance, frame the non-closeup camera view.

13. The apparatus of claim 12, wherein the processor is further configured to frame by:
if it is determined that the detected talker position does not match the previous closeup position of the talker within the first predetermined positional tolerance:
determine whether the detected talker position matches the previous closeup position of the talker within a second predetermined positional tolerance that is greater than the first predetermined positional tolerance;
if it is determined that the detected talker position matches the previous closeup position of the talker within the second predetermined positional tolerance, frame the non-closeup camera view as a local camera view that is zoomed-out from the closeup camera view; and
if it is determined that the detected talker position does not match the previous closeup position of the talker within the second predetermined positional tolerance, frame the non-closeup camera view as a best camera overview that is zoomed-out from the local camera view.

14. The apparatus of claim 11, wherein the processor is configured to:
perform the speaker clustering by attempting to match the speech segment in the detected audio to speech segments in the previously detected audio based on speech characteristics; and
if the attempting to match succeeds, determine that the detected talker is known, otherwise determine that the detected talker is not known.

15. The apparatus of claim 14, wherein the processor is further configured to:
if the speech segment matches one or more speech segments in a previous speaker cluster, assign the processed speech segments in the detected audio to the previous speaker cluster; and
if the processed speech segments in the detected audio do not match speech segments in a previous speaker cluster, assign the processed speech segments in the detected audio to a new speaker cluster.

16. A non-transitory processor readable medium storing instructions that, when executed by a processor, cause the processor to:
detect a talker position of a talker based on audio detected by one or more microphones;
detect one or more faces and face positions in video captured by one or more cameras;
determine whether the detected talker position matches any detected face position;
if there is no match, perform speaker clustering across a speech segment in the detected audio and speech segments in previously detected audio;
if the speaker clustering indicates the talker is known, determine whether the detected talker position matches a previous closeup position of the talker, wherein the previous closeup position is a previously detected talker position that matches a previously detected face; and
based on results of determining whether the detected talker position matches the previous closeup position of the talker, frame either a closeup camera view on the previous closeup position or a non-closeup camera view based on the detected talker position.

17. The processor readable medium of claim 16, wherein the instructions operable to frame include instructions operable to:
if it is determined that the detected talker position matches the previous closeup position of the talker within a first predetermined positional tolerance, frame the closeup camera view; and
if it is determined that the detected talker position does not match the previous closeup position of the talker within the first predetermined positional tolerance, frame the non-closeup camera view.

18. The processor readable medium of claim 16, wherein the instructions operable to frame further include instructions operable to:
if it is determined that the detected talker position does not match the previous closeup position of the talker within the first predetermined positional tolerance:
determine whether the detected talker position matches the previous closeup position of the talker within a second predetermined positional tolerance that is greater than the first predetermined positional tolerance;
if it is determined that the detected talker position matches the previous closeup position of the talker within the second predetermined positional tolerance, frame the non-closeup camera view as a local camera view that is zoomed-out from the closeup camera view; and
if it is determined that the detected talker position does not match the previous closeup position of the talker within the second predetermined positional tolerance, framing the non-closeup camera view as a best camera overview that is zoomed-out from the local camera view.

19. The processor readable medium of claim 16, wherein the instructions operable to perform speaker clustering include instructions operable to:
attempt to match the speech segment in the detected audio to speech segments in the previously detected audio based on speech characteristics; and
if the attempting to match succeeds, determine that the detected talker is known, otherwise determine that the detected talker is not known.

20. The processor readable medium of claim 19, wherein the instructions include instructions to cause the processor to control the one or more cameras to:
- if the speech segment matches one or more speech segments in a previous speaker cluster, assign the processed speech segments in the detected audio to the previous speaker cluster; and
- if the processed speech segments in the detected audio do not match speech segments in a previous speaker cluster, assign the processed speech segments in the detected audio to a new speaker cluster.

* * * * *